United States Patent
Nakano et al.

(10) Patent No.: US 6,306,542 B1
(45) Date of Patent: Oct. 23, 2001

(54) LITHIUM MANGANESE COMPOSITE OXIDE FOR LITHIUM SECONDARY BATTERY CATHODE ACTIVE MATERIAL, MANUFACTURING METHOD THEREOF, AND LITHIUM SECONDARY BATTERY USING THE COMPOSITE OXIDE AS CATHODE ACTIVE MATERIAL

(75) Inventors: Hideyuki Nakano; Yoshio Ukyo; Takahiko Honma, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/316,362

(22) Filed: May 21, 1999

(30) Foreign Application Priority Data

May 22, 1998 (JP) .................................................. 10-141067
Aug. 10, 1998 (JP) .................................................. 10-226313
Nov. 4, 1998 (JP) .................................................. 10-313641

(51) Int. Cl.[7] .............................. H01M 4/50; H01M 4/58; C01G 45/12
(52) U.S. Cl. ........................ 429/224; 429/231.1; 423/599
(58) Field of Search ............................. 423/599; 429/224, 429/231.1

(56) References Cited

U.S. PATENT DOCUMENTS 5,531,920 * 7/1996 Mao et al. ......................... 252/182.1

(List continued on next page.)

OTHER PUBLICATIONS

Rongji Chen, et al. "Cathodic Behavior of Alkali Manganese Oxides from Permanganate", J. Electrochemical Society, vol. 144, No. 4, Apr. 1997, pp. 64–67.

A. Robert Armstrong, et al. "Synthesis of Layered LiMnO$_2$ as an Electrode for Rechargeable Lithium Batteries", Nature, vol. 381, Jun. 6, 1996, pp. 499–500.

Primary Examiner—Tom Dunn
Assistant Examiner—Zidia Pittman
(74) Attorney, Agent, or Firm—Oblon, Spivak, McClelland, Maier & Neustadt, P.C.

(57) ABSTRACT

One of the most important subject of the present invention is to provide a new lithium manganese composite oxide which does not include the cobalt which is few as the resource and expensive.

For the above purpose, a lithium manganese composite oxide for a lithium secondary battery cathode active material represented by a composition formula of $Li_{1-x}A_x MnO_2$ (A is an alkali metal except for Li:$0<x<1$) and having a layered structure with a rock salt type ordered cations is adopted.

According to the lithium manganese composite oxide, the crystal structure is stabilized since the lithium site of the layered structure $LiMnO_2$ is replaced by the atom of alkali metal element having larger ionic diameter than the lithium ion. Accordingly, not only large discharge capacity is maintained but the cycle characteristic is excellent. In addition, since the lithium manganese composite oxide does not include the cobalt, it can be manufactured in low cost.

The present invention can also provide a simple and cheap manufacturing method of the above lithium manganese composite oxide, and a cheap lithium secondary battery which uses the above lithium manganese composite oxide as the cathode active material.

10 Claims, 8 Drawing Sheets

U.S. PATENT DOCUMENTS

| | | | |
|---|---|---|---|
| 5,759,510 | * 6/1998 | Pillai | 423/599 |
| 5,804,334 | * 9/1998 | Yamamura et al. | 429/218 |
| 5,871,863 | * 2/1999 | Miyasaka | 429/218 |
| 5,997,839 | * 12/1999 | Pillai | 423/599 |
| 6,156,455 | * 12/2000 | Yamamura et al. | 429/223 |
| 6,168,887 | * 1/2001 | Dahn et al. | 429/224 |

FOREIGN PATENT DOCUMENTS

| | | |
|---|---|---|
| 8-37027 | 2/1996 | (JP) . |
| 8-162159 | 6/1996 | (JP) . |
| 8-255633 | 10/1996 | (JP) . |
| 10-3921 | 1/1998 | (JP) . |

\* cited by examiner

⊘ O    ○ Li,(A)    ● Mn

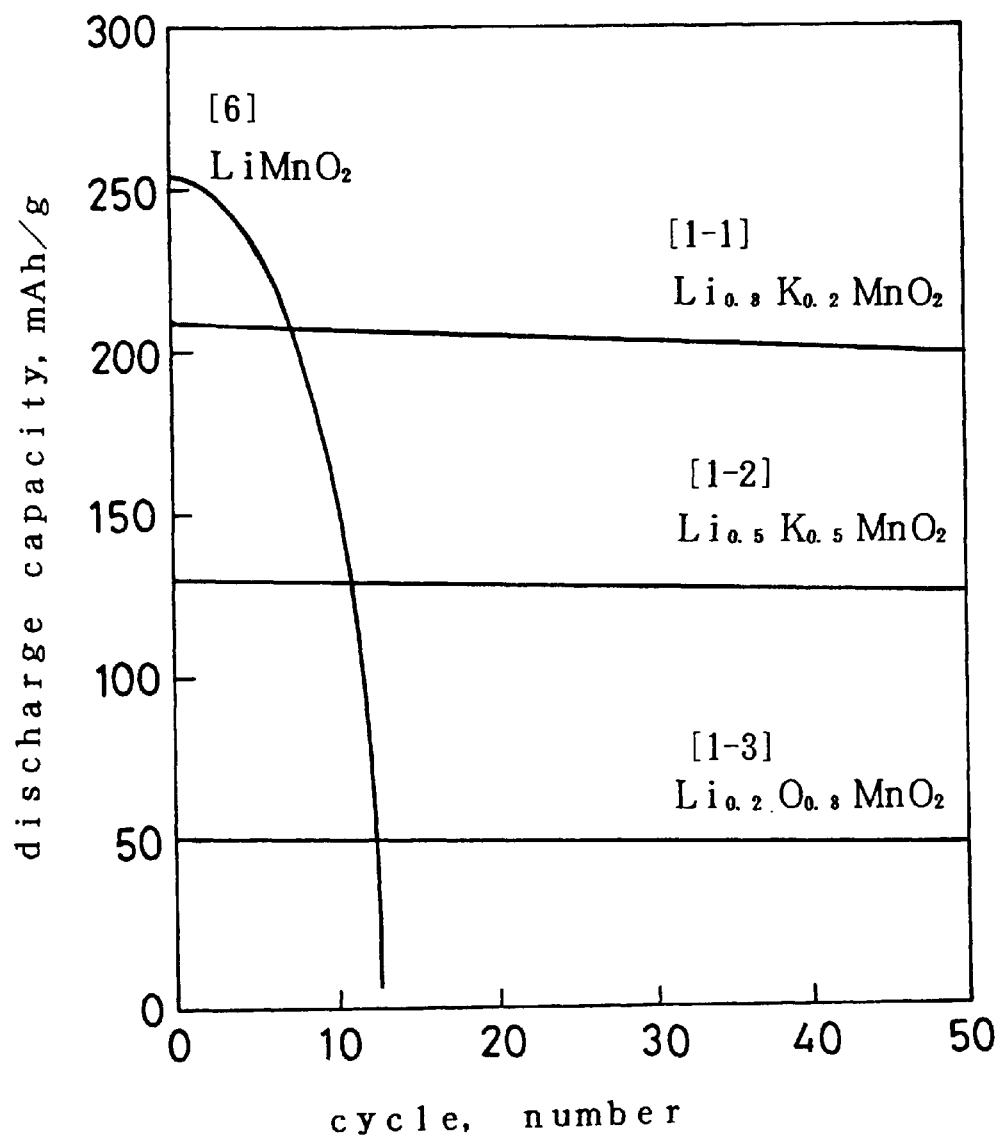

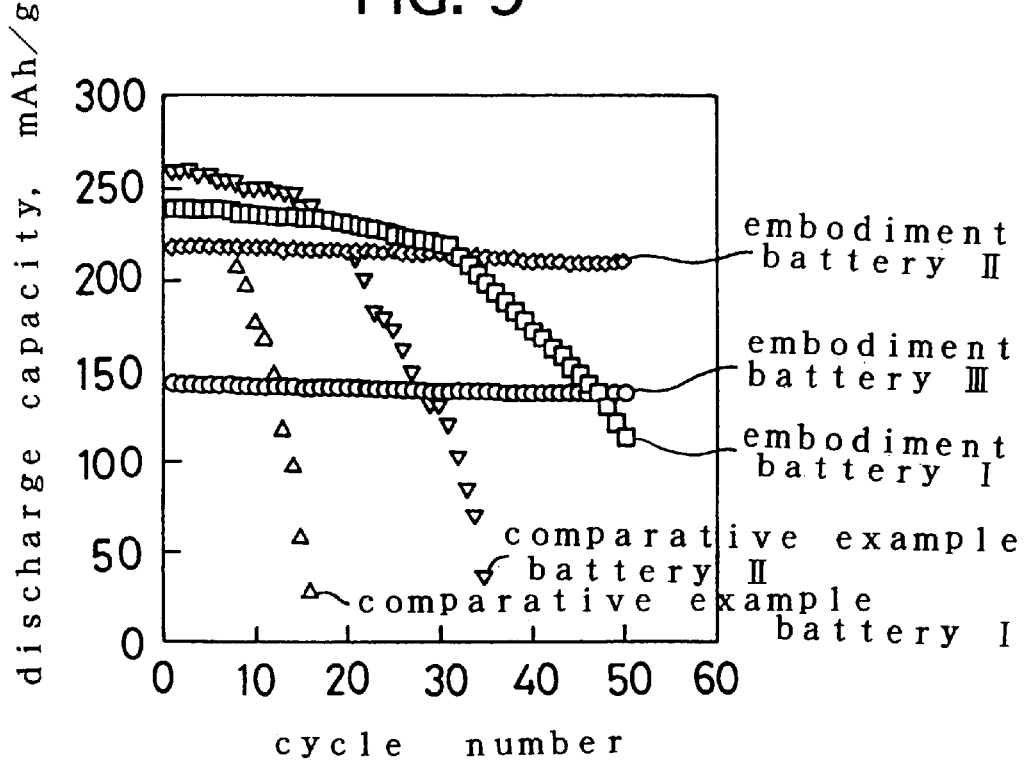

LITHIUM MANGANESE COMPOSITE OXIDE FOR LITHIUM SECONDARY BATTERY CATHODE ACTIVE MATERIAL, MANUFACTURING METHOD THEREOF, AND LITHIUM SECONDARY BATTERY USING THE COMPOSITE OXIDE AS CATHODE ACTIVE MATERIAL

BACKGROUND OF THE INVENTION

1. Field of the Invention

This invention relates to a lithium manganese composite oxide which can be used as a cathode active material and constitute a lithium secondary battery which is cheap, has large capacity and is excellent in charge-discharge cycle characteristic, a manufacturing method thereof, and a lithium secondary battery using the lithium manganese composite oxide as the cathode active material.

2. Related Background Art

With the miniaturization of the portable telephones and the personal computers, etc., the secondary battery with high energy density is required in the field of communication equipment and information relevant apparatus, so the lithium secondary battery has been widely used. Also, from aspect of resources problem and environmental problem, large request for the electric automobile exists in the field of the automobile, so the development of the lithium secondary battery which is cheap, has large capacity and is excellent in the cycle characteristic has been desired.

At present, for the secondary battery of 4V, the cathode active material of lithium secondary battery, $LiCoO_2$ with the layered structure with rock salt type ordered cations (R$\bar{3}$m) is adopted. In addition to easy synthesis and relatively easier handling, $LiCoO_2$ is excellent in the charge-discharge cycle characteristic, so the secondary battery which uses $LiCoO_2$ as the cathode active material has been mainly used.

However, since cobalt (Co) is few as the resources, the secondary battery which uses $LiCoO_2$ as the cathode active material is difficult to deal with the future mass production of the large-capacity battery as the power source for electric automobile, and necessarily becomes expensive. In view of this, adoption of the lithium manganese composite oxide which contains the manganese rich as the resource and cheap as the constituent element instead of the cobalt as the cathode active material has been tried.

Among the lithium manganese composite oxide, one which has the spinel structure (Fd3m) and which is represented by composition formula of $LiMn_2O_4$ is most stabilized. Although $LiMn_2O_4$ with the spinel structure can constitutes a lithium secondary battery of 4V as the cathode active material, the theoretical discharge capacity of $LiMn_2O_4$ is 148 mAh/g, which is smaller than 274 mAh/g of $LiCoO_2$.

The lithium manganese composite oxide with the layered structure is expected next. $LiMnO_2$ with the layered structure has the theoretical discharge capacity of 286 mAh/g, which is bigger than that of $LiMn_2O_4$ with the spinel structure, so it can be used as the effective cathode active material.

As $LiMnO_2$ with the layered structure, one which has the zigzag layered structure (Pmmn) of the rhombic system is well known. For example, Japanese Patent Laid-open No. 8-37027 shows to form $LiMnO_2$ with the zigzag layered structure by firing the mixture of LiOH and $Mn_2O_3$ mixed in the atomic ratio by Li/Mn=1/1.05 in the vacuum at temperature of 600 to 800° C. for 12 hours. However, this $LiMnO_2$ with the zigzag layered structure has the problem that 30 cycles forms the limit for the charge-discharge cycle maintained rate at capacity of 200 mAh/g.

Among $LiMnO_2$ with the layered structure, one which has a layered structure with rock salt type ordered cations (R$\bar{3}$) which is same as $LiCoO_2$ and $LiNiO_2$ seems to be a good cathode active material for lithium secondary battery, but the synthetic method for it has not been established. On account of advance of the research afterwards, $LiMnO_2$ with the layered rock salt type structure is synthesized by the method to be mentioned in the following.

(1) Japanese Patent Laid-open No.10-3921 shows the synthesizing method in which as the manganese source the inorganic salt such as $MnO_2$, $Mn_2O_3$, MnOOH or $MnCO_3$, or the organic acid salt such as manganese acetate, manganese butyrate, manganese oxalate or manganese citrate is used; as a lithium source LiOH, $LiNO_3$ or $Li_2CO_3$ etc. is used; and water or the organic solvents such as alcohols is used, to synthesize $LiMnO_2$ with the layered structure from them under saturated vapor pressure at the temperature of 100 to 300° C.(2) J.Electrocem.Soc., and 1997, 144, 64 shows the method using $KMnO_4$ as the starting material, to prepare $LiMnO_4$ through the ion-exchange reaction, to hydrothermally treat it in the nitric acid acidity atmosphere at the temperature 160° C. for three days and half, and to dehydrate it. (3) Nature 1996, 381,499 shows the synthesizing method to form $NaMnO_2$ obtained by the reaction of $MnO_2$ and NaOH at the temperature of 700° C. in the argon atmosphere and to ion-exchange it with LiCl in the nonaqueous solvent.

However, in the secondary battery which uses $LiMnO_2$ synthesized by the above method (1) as cathode active material, only the discharge capacity of 80 mAh/g can be obtained as is shown in Japanese Patent Laid-open No.10-3921, whereas the theoretical discharge capacity is 286 mAh/g. In the above method (2), in addition to the defect in the manufacturing process that it includes the multistage reactions and requires the accuracy in preparation of the solution by each stage of work, when the battery is constituted by using the $LiMnO_2$ as the cathode active material, only discharge capacity of 50% or less of the initial capacity can be obtained after 10 cycles;, which deteriorates the charge-discharge cycle characteristic extremely. The above method (3) needs both of the synthesizing of $NaMnO_2$ which is the precursor and the ion-exchanging reaction in the nonaqueous system, which leads to increase of the manufacturing cost. Also, it is reported $LiMnO_2$ crystal synthesized thorough this process has the discharge capacity density of about 270 mAh/g as the cathode active material, but in fact, the charge-discharge cycle characteristic reduces down to 50% of the initial capacity after 50 cycles, thus involving problem in the stability of crystal structure.

It seems that this inferior cycle characteristic is essential problem because $LiMnO_2$ used as the cathode active material has the layered rock salt type structure. In short, this problem is firstly resulted from that in case of the layered rock salt type structure, the lithium layer exists between the oxygen layers of high electronegativity, and the distance between the oxygen layers is enlarged by the electrostatic repulsive force therebetween as decrease of lithium amount due to charge of the battery, to make the crystal structure itself unstable. Above problem is secondary resulted from that as decrease of the lithium amount, $LiMnO_2$ changes to $LiMn_2O_4$ in composition, to transform to the more stable spinel structure.

The lithium secondary battery in which $LiMnO_2$ with the layered rock salt type structure is adopted as the cathode active material can not be practical unless this problem of cycle characteristic is solved. Whereas, the effective technology which can solve the problem of this cycle characteristic has not existed conventionally.

In the beginning, the lithium secondary battery which lithium has started from the secondary battery which uses the metallic lithium for the negative electrode. However, because the dendrite is precipitated on the surface of metallic lithium in the negative electrode to cause the problem of short of the battery, so-called lithium ion secondary battery which uses the carbon material for the negative electrode has been used recently.

Whereas, when the carbon material is used as anode active material, the problem of retention in turn occurs. When the retention occurs, the part of the lithium intercalated into the negative electrode by the first charging is irreversibly incorporated into the negative electrode, and remaining in the negative electrode even after the succeeding discharge to thereby cause decrease of the discharge capacity of the battery. This retention is the peculiar problem to the carbon material and in somewhat unavoidable, as long as the carbon material is used as the anode active material.

As mentioned above, when producing of the cheap lithium ion secondary battery is intended, the lithium manganese composite oxide in which the cheap manganese constitutes is preferably used as the cathode active material. Although the theoretical discharge capacity of the above $LiMnO_2$ with the layered rock salt type structure is large, the lithium ion secondary battery which adopts $LiMn_2O_4$ with the spinel structure as the cathode active material is preferably used by the reason of stabilized crystal structure thereof.

However, the problem of retention occurred in the negative electrode becomes more serious in case of the lithium ion secondary battery which adopts $LiMn_2O_4$ with the spinel structure as the cathode active material. In short, the amount of lithium returned to the positive electrode by the discharge drastically decreases, because the lithium amount irreversibly incorporated into the negative electrode using the carbon material is constant peculiar to the negative electrode, when $LiMn_2O_4$ with spinel structure of small lithium contained amount per unit weight and of small theoretical discharge capacity is used as the cathode active material.

As the means for compensating for the retention which occurs in the negative electrode, Japanese Patent Laid-open No.8-162159 shows to intercalate, by using the metallic lithium, the lithium of the amount corresponding to the irreversible capacity in the negative electrode using carbon material by electrochemical manner in advance, before or after assembling the battery; while Japanese Patent Laid-open No.8-255633 shows to intercalate, by using the metallic lithium, the lithium of amount corresponding to the irreversible amount in the positive electrode at once, and discharging it after assembling the battery to intercalate it in the negative electrode.

However, in the above method, the metallic lithium active in the air is handled before assembling of the battery, and the complicated work which pays the careful attention in work environment is needed. Also, in this method, there is some possibility that the metallic lithium remains in the battery, which is not preferable for safety. In addition, the lithium intercalated in the negative electrode using carbon material is unstable, and is easily resolved into $Li_2CO_3$.

SUMMARY OF THE INVENTION

1) This invention is made in view of the above circumstances, and includes three subjects. The first subject is to provide a new lithium manganese composite oxide (referred to simply "lithium manganese oxide" hereinafter) which does not include the cobalt which is few as the resource and expensive, and to provide a cheap lithium secondary battery in which the above lithium manganese oxide is adopted as the cathode active material. The second subject is to provide the lithium secondary battery in which the crystal structure is stabilized and the cycle characteristic is excellent with maintaining the merit of the layered structure with rock salt type ordered cations (referred to simply "layered structure" hereinafter) capable of constituting the battery of about 4V and having the large theoretical discharge capacity. The third subject is to manufacture the lithium manganese oxide with layered rock salt type structure (referred to simply,layered lithium manganese oxide, hereinafter) in the simple manner, instead of the conventional method for manufacturing the lithium manganese oxide.

The present invention also has the subject, in the lithium secondary battery which adopts the lithium manganese oxide with the spinel structure having been practically developing, to attenuate the retention occurred in the negative electrode by the safe and simple manner, to thereby realize the lithium secondary battery which is cheap, has large discharge capacity and is excellent in the cycle characteristic.

2) The inventors notices that the crystal structure can be stabilized by replacing the part of lithium atoms of $LiMnO_2$ with the layered structure by the atoms of metallic element which also belongs to the alkali metal and is bigger than lithium, to reach the present invention. In short, the lithium manganese oxide for lithium secondary battery cathode active material of the present invention comprises a composition of the formula $Li_{1-x}A_xMnO_2$ (A is alkali metal except for Li:0<x<1) which has the layered structure.

The crystal structure of the lithium manganese oxide of the present invention is the layered structure ($R\overline{3}m$) which belongs to hexagonal system, the unit lattice of which is shown in FIG. 1. The features of the layered structure is that the atoms of identity or homologous element makes the layer to form the laminated crystal structure. In case of $LiMnO_2$ with the layered structure (referred to simply "the layered $LiMnO_2$" hereinafter), these layers are composed of the layer of oxygen atoms, the layer of manganese atoms and the layer of lithium atoms, and are laminated as shown FIG. 1, which has independent layer of the lithium atoms unlike $LiMn_2O_4$ with the spinel structure (Fd3m) (referred to simply "the spinel $LiMn_2O_4$" hereinafter).

The lithium layer which constitutes the layered structure $LiMnO_2$ exists between the oxygen layers of high electronegativity, and when the lithium atoms existed in the lithium layer is deintercalated out of the crystal after they have changed to the ion to reduce the number thereof, it is assumed that two oxygen layers sandwiching the lithium layer are positioned in adjacent relation. Consequently, the electrostatic repulsive force between two oxygen layers surpasses van der waals force to enlarge distance therebetween, so that the crystal structure is collapsed. In addition, as decrease of the lithium atoms, the lithium layer has tendency that the chemical composition thereof changes to $LiMn_2O_4$ to transform it to more stable spinel structure.

Different from the above layered $LiMnO_2$ in the layered $Li_{1-x}A_xMnO_2$ (A is alkali metal except for Li:0<x<1), the part of lithium atoms which forms the lithium layer is replaced by the atoms of alkali metal which also belongs to the element of group I and has the ion diameter larger, than the lithium to have the layer composed the atoms of lithium and the atoms of homologous element. In other words, it has the crystal structure in which the atom of the above alkali metal is coordinated at the site where the lithium atom of the lithium layer should be coordinated. As the above alkali metal, sodium, potassium, rubidium and cesium are preferable.

It is assumed that by existing the atom of the large size in the lithium layer between the oxygen layers, the distance between two oxygen layers which holds a lithium layer is increased to weaken the electrostatic repulsive force therebetween, so that the crystal structure is maintained even it deintercalated lithium atoms. Therefore, one element or more than two elements of the atoms to be replaced at the lithium site can be selected from sodium, potassium, rubidium and cesium. As a result of the above action, in the lithium secondary battery adopting for example this layered $Li_{1-x}A_xMnO_2$ as the cathode active material, there is no collapse of crystal structure, etc. even by repeating charge and discharge, whereby small capacity degradation is realized.

Values of x of the composition formula of $Li_{1-x}A_xMnO_2$, that is rate to be replaced can be decided corresponding to using purpose and usage, etc. When the lithium manganese oxide is used for secondary battery, the amount of the lithium atoms intercalated and deintercalated decreases as the replaced rate increases, so the replaced rate should be decided by considering the discharge capacity and charge-discharge cycle characteristic, etc., when the battery is designed. Since there is some lithium manganese oxide which contains water of hydration in the crystal thereof, so the above composition formula of $Li_{1-x}A_xMnO_2$ includes a composition formula of $Li_{1-x}A_xMnO_2 \cdot nH_2O$ which contains the water of hydration. Also, the layered lithium manganese oxide includes one represented by a composition formula of $Li_{1-x}A_xMnO_{2-\delta}$ in which the part of the cations is deficient, as well as the stoichiometric one. In order to further improve the cycle characteristic, the lithium manganese oxide in which the Mn site is partially replaced by another metallic atoms such as Ni, Co, Fe, Cr. Cu and Al etc. and which is represented by the composition formula of $Li_{1-x}A_xMn_{1-y}Me_yO_2$, or one in which Mn site is partially replaced by Li and which is represented by a composition formula of $Li_{1-x+z}A_xMn_{1-z}O_2$ can be adopted.

As mentioned above, the present invention can constitute the secondary pattery realizing about 4V, and is excellent in the charge-discharge cycle characteristic by adopting the lithium manganese oxide having the same crystal structure as the layered $LiMnO_2$ which has large theoretical discharge capacity and the part of which is replaced by the atoms of equivalent alkali metallic element.

Next, the manufacturing method of the lithium manganese oxide for the lithium secondary battery cathode active material of the present invention is comprised of the preparation process for preparing the mixed aqueous solution by mixing $AMnO_4$ (A is the alkali metal except for Li) aqueous solution and Li chemical composition; and the hydrothermal process for producing the lithium manganese oxide by heating the aqueous solution.

In short, the present invention is based on knowledge obtained through the repeative examination by the inventors, that layered $Li_{1-x}A_xMnO_2$ can be synthesized in one stage reaction, when mixed aqueous solution in which the composition ratio of manganese salt and Li chemical composition used as the raw material is adjusted is heated under the saturated vapor pressure. Thus, the manufacturing method of the lithium manganese oxide for the lithium secondary battery cathode active material is extremely convenient, since the uniform layered lithium manganese oxide can be obtained in moderate one stage reaction by mixing the aqueous solution raw materials easy for handling.

In the above manufacturing method, the dehydration process for thermally dehydrating the lithium manganese oxide can be added. The lithium manganese oxide obtained by the hydrothermal process is represented by the composition formula of $Li_{1-x}A_xMnO_2 \cdot nH_2O$ and contains the water of hydration. By the thermal dehydration for $Li_{1-x}A_xMnO_2 \cdot nH_2O$, the water of hydration is removed to produce the layered lithium manganese oxide which has the high crystallinity.

Next, the lithium secondary battery of the present invention comprises the positive electrode which comprises the lithium manganese oxide as the cathode active material, represented by the composition formula of $Li_{1-x}A_xMnO_2$ (A is alkali metal except for Li; 0<x<1) which has the layered structure.

The lithium secondary battery is cheap since it uses the cathode active material which does not use expensive cobalt, and is excellent in the cycle characteristic with maintaining large discharging capacity on account of above feature of the lithium manganese oxide.

In addition, the lithium secondary battery of this invention can include the negative electrode in which the carbon material is used as the anode active material, according to which the precipitation of dendrite on the negative electrode surface is small and is excellent in safety.

Further, the lithium secondary battery of present invention comprises the positive electrode comprising the mixture of the lithium manganese oxide represented by the composition formula of $Li_{1-x}A_xMnO_2$ (A is the alkali metal except for Li:0<x<1) which has the layered structure and the lithium manganese oxide represented by the composition formula of $LiMn_2O_4$ which has the spinel structure, as the cathode active material; and the negative electrode comprising the carbon material as the anode active material. In short, the cathode active material is produced by mixing the layered $Li_{1-x}A_xMnO_2$ with the conventional spinel $LiMn_2O_4$.

According to the lithium secondary battery of this embodying form, the cathode active material is produced by mixing two kinds of the lithium manganese oxides with different crystal structure, one of which is the spinel $LiMn_2O_4$. Although $LiMn_2O_4$ can constitute the secondary battery excellent in the cycle characteristic, the lithium contained amount per unit weight thereof is small, so the retention rate (initial charge-discharge capacity difference/initial charge capacity ×100%) is large when it is used as the cathode active material.

In this specification, the lithium manganese oxide with the spinel structure represented by the composition formula $LiMn_2O_4$ includes, in addition to the stoichiometric one, one lacking cations and represented by a composition formula of $LiMn_2O_{4-\delta}$, one in which Mn site is partially replaced by another metal atoms Me such as Ni, Co, Fe, Cr, Cu an.d Al and represented by a composition formula of $LiMn_{2-y}Me_yO_4$, one in which Mn site is partially replaced by lithium atoms and represented by a composition formula of $Li_{1+x}Mn_{2-x}O_4$, and the known lithium manganese oxide having the spinel structure.

The other lithium manganese oxide is above mentioned layered $Li_{1-x}A_xMnO_2$ of which the crystal structure is unstable compared with the spinel $LiMn_2O_4$, to have slightly inferior cycling characteristics when it is used to constitute the secondary battery. However, the layered structure has large amount of lithium contained therein per unit weight, that is the discharge capacity is large, to make the retention rate small and can constitute the secondary battery having large discharge capacity.

In short, in the lithium secondary battery of this form, the defect of each lithium manganese oxide is supplemented by the merit of each lithium manganese oxide by using mixture of two kinds of lithium manganese oxides with different crystal structure as cathode active material. Thus, the lithium secondary battery of the present invention can safely and simply compensate the retention occurred in the negative electrode without using the metallic lithium, and can improve the lithium ion secondary battery using the lithium manganese oxide with spinel structure which has been developing practically as the main cathode active material for the secondary battery having large discharging capacity and being excellent in the cycle characteristic.

3) The embodying forms of the present invention will be explained hereinafter. To begin with, the manufacturing method of layered lithium manganese oxide for the lithium secondary battery cathode active material is explained; then, confirmed result of the crystal structure by X-ray diffractometry and observed result by the electron microscope of the lithium manganese oxide which is one form of the lithium manganese oxide and represented by the composition formula of $Li_{1-x}K_xMnO_2$ is explained; and finally, the main component of the lithium secondary battery which uses the lithium manganese oxide as the cathode active material is explained.

Manufacturing Method of the Layered Lithium Manganese Oxide

Although the manufacturing method of the layered lithium manganese oxide represented by the composition formula of $Li_{1-x}A_xMnO_2$ (A is alkali metal except for Li:0<x<1) is not limited, the following manufacturing method is preferable to manufacture simply the above oxide which can be used as the excellent cathode active material.

The manufacturing method of the lithium manganese oxide for lithium secondary battery cathode active material of the present invention comprises the aqueous solution preparation process for preparing the aqueous solution including the raw material of predetermined composition ratio, and the hydrothermal process for heating the aqueous solution to react it.

In the aqueous solution preparation process, $AMnO_4$ (A is the alkali metal except for Li) aqueous solution to be the source of the alkali metal and the manganese, and the Li chemical composition to be the lithium source are mixed by the amount in proportion to the composition ratio of Li/A in the layered $Li_{1-x}A_xMnO_2$ to be obtained. Since the Li chemical composition and $AMnO_4$ are reacted in the aqueous solution, Li chemical composition is preferably water-soluble and is preferably mixed as the aqueous solution. As the water-soluble lithium composition, LiCl, LiOH, $LiNO_3$, lithium acetate, lithium butyrate, lithium oxalate and lithium citrate, etc. can be used. The concentration of the $AMnO_4$ aqueous solution is preferably about 0.1M to 0.3M. When the Li chemical composition is mixed as the aqueous solution, the concentration of the Li chemical composition aqueous solution is preferably about 0.1M to 5.0M. The concentration of mixing aqueous solution influences the particle size of lithium manganese oxide to be obtained, and generally, the concentration of the aqueous solution is preferably increased to produce the composite oxide with small particle size, to be explained later.

In the hydrothermal process, the above mixed aqueous solution is heated to form the lithium manganese oxide by precipitation thereof from the solution, and this process is preferably carried out in long time under the saturated vapor pressure, at the temperature of 120 to 250° C. When the heating temperature is under 120° C., $AMnO_4$ and Li chemical composition are not reacted, while when it exceeds 250° C. the cost will be increased, so the heating temperature is more preferably below 200° C. Still, it is preferable to use the equipment such as the autoclave in order to avoid the evaporation of the aqueous solution.

The hydrothermal process can be carried out in the stationary water condition, or in the stirring condition. In the case of stirring the aqueous solution, the particle size of the powder of the lithium manganese oxide to be obtained can be differentiated by changing the stirring speed. As explained above, the powdery lithium manganese oxide with the small particle size can be obtained by stirring the aqueous solution of high concentration strongly or in high speed, while the powdery lithium manganese oxide with large particle size can be obtained by mixing aqueous solution of the low concentration moderately or slowly.

Formed powder is precipitated in the reactor container as the precipitation. The powdery layered lithium manganese oxide represented by the composition formula of $Li_{1-x}A_xMnO_2$ can be obtained by washing and filtering this precipitation. According to the manufacturing method which includes such process, the uniform composite oxide is obtained by only mixing the aqueous solution raw material of easy handling to cause the moderate single stage reaction near 200° C. which is very convenient and practical.

The composite oxide manufactured after having completed the hydrothermal process includes the water of hydration and is represented by the composition formula of $Li_{1-x}A_xMnO_2 \cdot nH_2O (0.3 \leq n \leq 0.7)$. Following dehydrating may be carried out when manufacturing the composite oxide which does not contain the water of hydration is preferable.

In the dehydrating process, the water of hydration included in crystal structure is removed by thermal dehydration of lithium manganese oxide obtained by the above hydrothermal process. Although dehydrating process is no limmited, this method is preferably carried out at temperature of 100 to 250° C. The dehydration becomes incomplete under the heating temperature of 100° C. and the crystal structure of composite oxide to be obtained transforms from the layered structure to the spinel structure when the heating temperature exceeds 250° C. In addition, the dehydrating is preferably carried out in the atmosphere, because the crystal is reduced under the decreased pressure.

Confirmation of Crystal Structure by X-ray Diffraction

The crystal structure of the layered lithium manganese oxide is confirmed by the X-ray diffraction method, for the lithium manganese oxide represented by the composition formula of $Li_{1-x}K_x MnO_2$. The specimen of $Li_{1-x}K_xMnO_2$ is, according to the above manufacturing method, manufactured by mixing the 0.3M $KMnO_4$ aqueous solution and the 0.3M LiCl aqueous solution by the atomic ratio of Li/K=4/1, 1/1, 1/4, reacting in the autoclave lined by Teflon under the hydrothermal condition at temperature of 200° C. in three days, filtering and washing the precipitation in the container, and heating to dehydrate it at temperature of 200° C. in 4 hours. Obtained specimens are dark-brown powders and having the composition formula of $Li_{0.8}K_{0.2}MnO_2$. $Li_{0.5}K_{0.5}MnO_2$ and $Li_{0.2}K_{0.8}MnO_2$, respectively.

For these specimens, X-ray diffraction by CuK α is carried out. The X-ray diffraction diagram of the specimen of $Li_{0.8}K_{0.2}MnO_2$ is shown in FIG. 2 for illustration, and other two X-ray diffraction diagrams are similar to it. As result of analysis, it is confirmed that all of these lithium manganese oxides can be indexed as the hexagonal having the lattice constants of a=2.71 to 3.01 Å and c/3=4.91 to 6.43 Å, and belongs to R$\overline{3}$m which is peculiar space group for the layered structure crystal from the extinction rule.

Although this analytical result is for the $Li_{1-x}K_xMnO_2$, it is assumed that the similar result will be obtained for $Li_{1-x}Na_xMnO_2$, $Li_{1-x}Rb_xMnO_2$ and $Li_{1-x}Cs_xMnO_2$ which are other lithium manganese oxides. Here, although the value of lattice constants differs, according to kind of the alkali metal elements to be replaced at the lithium site, or amount of water of hydration if included, in case of the layered lithium manganese oxide to be used for the lithium secondary battery, it is assumed that the value belongs to the range a=2.69 to 3.03 Å, c/3=4.87 to 9.31 Å, judging from the atom diameter etc. of atoms constituting it. Also, a thickness of the complex layer composed of the manganese atoms and the oxygen atoms common to the various layered lithium manganese oxide, that is the layer composed of the manganese atom layer and two oxygen atom layers sandwiching it, is 2.5 to 3.0 Å. Further, it is assumed that these complex layers are laminated, with sandwiching the layer composed of the lithium atoms and the alkali metal atoms, at a distance of 6 to 10 Å.

Observation about the Layered Lithium Manganese Oxide by Electron Microscope

The electron microscope observation is carried out for the layered lithium manganese oxide represented by the composition formula of $Li_{0.8}K_{0.2}MnO_2$, among the specimens subjected to the above X-ray diffraction analysis. Scanning electron microscope (SEM) photograph which shows the lithium manganese oxide particle is shown in FIG. 3, the particle in which has spherical shape of 1 to 15 μm diameters. The specimen of this photograph is the powder having about 7 μm in the average particle size, but the average particle size of the particle is preferably 1 to 50 μm (more preferably 1 to 2 5 μm) when it is used as the lithium secondary battery cathode active material. For adjustment of the particle diameter, the relation between the concentration of the mixed aqueous solution and the stirring can be changed as mentioned above. The particle shown in the photograph has the particle shape similar to the true sphere, but it can have substantially spherical shape with a little unevenness or warp.

The particle is featured by the countless gills formed on the surface thereof. FIG. 4 shows the photograph photographed by the transmission-type electron microscope (TEM) and is observed by irradiating the electron beam parallel to the crystal layer, in which the part of the grill is enlarged to the atom level. As apparent from this photograph, the crystal forms the layer to show the feature of the layered structure clearly. The layer photographed in black is one composed of the manganese atoms and the oxygen atoms, that is the complex layer composed of the manganese atom layer and two oxygen atom layers sandwiching it, while the layer photographed in white is the part where the layer composed of the lithium atoms and the potassium atoms exists. The layer composed of the manganese atoms and the oxygen atoms is observed to have a thickness of about 3 Å, which is coincided with the above analysis by the X-ray diffraction. Also, this layer is observed to be laminated at a distance of 7 Å, which is also coincided with the above analysis by the X-ray diffraction.

Totally judging from the observed result of SEM and TEM, each of gills forms the primary particle of the single crystal, and the crystal is of approximately hexagon plate-shape of which thickness in the lamination direction is approximately equal to that of the gill and within in the range of 0.05 to 0.5 μm, 0.1 μm in average. In short, in the layered lithium manganese oxide shown by these two photographs, the hexagon plate-like primary particles having thickness of 0.05 to 0.5 μm are complicatedly intertwined to form the globular secondary particle having the particle size of 1 to 15 μm and having gills thereon. The composite oxide has large surface area on account of the countless gills and forms the spherical secondary particle so that the gill direction of the primary particle becomes disordered, both of which are convenient to intercalate and to deintercalate the lithium ion.

Main Components of Lithium Secondary Battery

As example of usage of the above layered structure lithium manganese oxide, the main components of lithium secondary battery which uses it as the cathode active material is explained. Generally, the lithium secondary battery is composed of the positive electrode and the negative electrodes which intercalate and deintercalate the lithium ion, the separator sandwiched between the positive and negative electrodes, and the nonaqueous electrolytic solution which moves the lithium ion between the both electrodes. The secondary battery of the this embodying form has similar construction, so following descriptions will be made on each of these components.

The positive electrode is formed by mixing the cathode active material which can inetcalate and deintercalate the lithium ion with the conducting material and binder, adding suitable solvent if necessary, to make the cathode material paste, coating the paste on the current collector made of the metallic foil and dring, and increasing the active material density by the press. The positive electrode is also formed by pressurizing the above cathode material paste to have the pellet shape, and attaching it to the current collector net such as the stainless steel under pressure.

Although the layered lithium manganese oxide represented by the composition formula of $Li_{1-x}A_xMnO_2$ (A is the alkali metal except for Li:0<x<1), is used as the cathode active material, various lithium manganese oxide can be adopted as the cathode active material according to kind and replaced rate of the alkali metallic element to be replaced at the lithium site. In the secondary battery of the this embodying form, one or mixture of more than two of the above variations can be used as the cathode active material. In addition, it is possible to mix the above layered lithium manganese oxide with another known cathode active material such as the layered $LiCoO_2$, the layered $LiNiO_2$, or the spinel $LiMn_2O_4$, etc.

The conducting material to be used for the positive electrode ensures the electrical conduction property of the positive electrode, and one kind or the mixture of more than two kinds of the carbon material powder such as carbon black, acetylene black, graphite can be used thereof. The binder has role to connect the active material particle, and the resin including the fluorine such as polytetrafluoroethylene, polyvinylidene fluoride, and fluororubber; and the thermoplastic resin such as polypropylene, polyethylene can be used. As the solvent to disperse the active material, the conducting material and the binder, the organic solvents such as N-methylpyrrolidone can be used. As the positive current collector, the aluminum foils can be used.

The negative electrode of this embodying form is formed by making the metallic lithium opearating as the anode active material into the sheet-shape, or by attaching the sheet-like metallic lithium to the current collector net made of Nickel or stainless-steel under pressure, similar to the conventional art. Instead of the metal lithium, the lithium alloy or the lithium composition can be used as the anode active material.

Another form of the negative electrode can be formed by using the carbon material which can intercalate and deintercalate the lithium ion in the anode active material, which is so-called the embodying form as the lithium ion secondary battery. There are only small problems of the precipitation of the dendrite to the negative electrode surface, when the carbon material is used as the anode active material, whereby the lithium secondary battery more excellent in the safety can be realized. As the usable carbon material,for example, the graphite, the organic compositions (such as the phenolic resin) fired material and the coke are listed. In this case, the negative electrode is formed by mixing the anode active material with the binder, adding the solvent to make it into the paste condition, and coating the paste onto the surface of the current collector made of metallic foil and dring.

When the carbon material is used as the anode active material, the resin including fluorine such as polyvinylidene fluoride is used as the binder, and the organic solvents such as N-methylpyrrolidone is used as the solvent. Alternately, the composite binder composed of one or more than two cellulose ether system material selected from the group of methylcellulose, or carboxymethyl cellulose etc. and the synthetic rubber system latex type binder such as stylene-butadiene rubber latex, or carboxy degenerated stylene-butadiene rubber latex is used as the binder; and the water is used as the solvent. As the current collector the copper foil can be used.

The separator to be sandwiched between the positive electrode and the negative electrode holds the electrolytic solution to pass the ion with separating the positive electrode and the negative electrode, and thin porous film made of such as polyethylene or polypropylene can be used as the separator.

The nonaqueous electrolytic solution is made by dissolving the electrolyte into the organic solvent, and the aprotic organic solvent such as one or more than two of ethylenecarbonate, propylenecarbonate, dimethyl carbonate, diethyl carbonate, γ-buthyrolactone, acetonitrile, dimethoxyethane, tetrahydrofuran, dioxolane or methylene chloride, etc. can be used. As the electrolyte to be dissolved, LiI, $LiClO_4$, $LiAsF_6$, $LiBF_4$, $LiPF_6$ etc. which generate the lithium ion by dissolution can be used. Instead for the noniqueous electrolytic solution, the solid electrolyte etc. can be used.

The lithium secondary battery according to this embodying form can be the coin type, laminate type, cylindrical type, etc. In any types, the separator is sandwiched between the positive electrode and the negative electrode as the electrode unit, for conducting the portions between the positive electrode and the positive terminal, and the portion between the negative electrode and the negative terminal, respectively. This electrode unit is packed into the battery case together with the nonaqueous electrolytic solution to construct the battery.

Next, the remarkable embodying form of the lithium ion secondary battery which includes the layered lithium manganese oxide as the cathode active material will be explained, the cathode active material of which is composed of the lithium manganese oxide with the layered structure and that with the spinel structure, as mentioned above.

In the lithium secondary battery of this form, one of the lithium manganese oxide which constitutes the cathode active material is the spinel $LiMn_2O_4$ for which available powdery one can be easily obtained. It can be manufactured by the solid state reaction method, the hydrothermal synthesis and firing method or the spray combustion method. In synthesizing by the solid state reaction, mixture of $MnO_2$ with $Li_2\,CO_3$ is fired at temperature of 600 to 1000° C.

For example, the layered lithium manganese oxide which is another component may be produced by the above mentioned manufacturing method. The replaced rate by the alkali metal atom A at the Li site, that is the value of x in the composition formula of $Li_{1-x}A_xMnO_2$ may be decided in a balance between lithium content amount per unit weight and stability of the crystal structure. When the replaced rate increases, the crystal structure is more stabilized, so that characteristics of the secondary battery become good in a case it forms the secondary battery, but in turn, the lithium content amount per unit weight decreases. In the lithium ion secondary battery of this form, the layered $Li_{1-x}A_xMnO_2$ has role to decrease the retention rate to thereby keep the discharge capacity of the battery in great, so the replaced rate by the alkali metal atom A, that is the value of x is preferably 0<x<0.5.

The mixing rate between the spinel $LiMn_2O_4$ and the layered $Li_{1-x}A_xMnO_2$ to be used as the cathode active material is decided, by totally considering the retention rate, the discharge capacity, the cycle characteristic when it constitutes the battery. It is convenient to use the inclusion ratio of Li to Mn in the mixed lithium manganese composite oxide for the parameter which determines the mixing rate. The spinel $LiMn_2O_4$ is preferably mixed with the layered $Li_{1-x}A_xMnO_2$ when the inclusion ratio of Li to Mn (Li/Mn) is used so that the inclusion ratio is 0.55<Li/Mn<0.65, since the discharge capacity and the cycle characteristic are balanced in this range, so that the secondary battery of high-performance is realized.

All of other component of the lithium ion secondary battery of this form except for the cathode active material can be equivalent to the components of the above lithium secondary battery. In the lithium secondary battery in this form, since only the lithium manganese composite oxide which uses the cheap manganese is adopted as the cathode active material, the battery is very cheap. Also, the retention peculiar to the negative electrode using carbon material can be attenuated by the simple and safe manner without using the metallic lithium different from the conventional art, which enables to realize the secondary battery having the large discharge capacity and being excellent in the cycle characteristic.

BRIEF DESCRIPTION OF THE DRAWINGS

FIG. 8 is the explanatory view showing the relation between the replaced rate of alkali metal element and the cycle characteristic in the lithium secondary battery of the first embodiment; and FIG. 9 is the explanatory view for showing the discharge capacity in each cycle, in the lithium secondary battery of the second embodiment.

DETAILED DESCRIPTION OF THE PREFERRED EMBODIMENT

First Embodiment

Based on the above embodying form, various layered lithium manganese oxide represented by the composition formula of $Li_{1-x}A_xMnO_2$ which can be used as the cathode active material is produced by altering the kind or changing the rate of alkali metal element to replaced in the lithium site, and the lithium secondary battery having a coin type is constituted by using these oxides. These secondary batteries are listed as the embodiment. Also, some comparative examples of the secondary battery are produced to compare with the embodiment in the following experiment, in one comparative example of which the layered lithium manganese oxide which is represented by the composition formula of $Li_{1-x}H_xMnO_2$ in which the part of lithium site is replaced by the hydrogen atom is used as the cathode active material, while in other of which the layered lithium manganese which is represented by the composition formula of $LiMnO_2$ in which the lithium site is not replaced are produced. By carrying out the charge-discharge cycle test f or these secondary batteries, the relation between the composition of the layered lithium manganese oxide to be used as the cathode active material and the initial discharge capacity of the battery, the relation between the kind of elements to be replaced and the capacity maintained rate, and the relation between the replaced rate and the cycle characteristic are checked. The embodiments, the comparative examples and the result of the charge-discharge cycle test are explained in the following.

Embodiment 1

In this embodiment 1 of the secondary battery, the layered lithium manganese oxide represented by the composition formula of $Li_{1-x}K_xMnO_2$ and synthesized by the above mentioned manufacturing method is used as the cathode active material. In the first, the $KMnO_4$ aqueous solution of 0.3M and the LiCl aqueous solution of 0.3M are mixed by the atomic ratio of Li/K=4/1, 1/1 and 1/4, and then this mixed solution is reacted in the autoclave lined by the Teflon under the hydrothermal condition at temperature 200° C. for three days, and then the precipitation in the container is filtered and washed with water. Next, this precipitation is thermally dehydrated at the temperature of 200° C. in 4 hours to remove the water of hydration from it. The composition of the powdery layered lithium manganese oxide obtained is respectively $Li_{0.8}K_{0.2}MnO_2$, $Li_{0.5}K_{0.5}MnO_2$ and $Li_{0.2}K_{0.8}MnO_2$.

Figure 1:
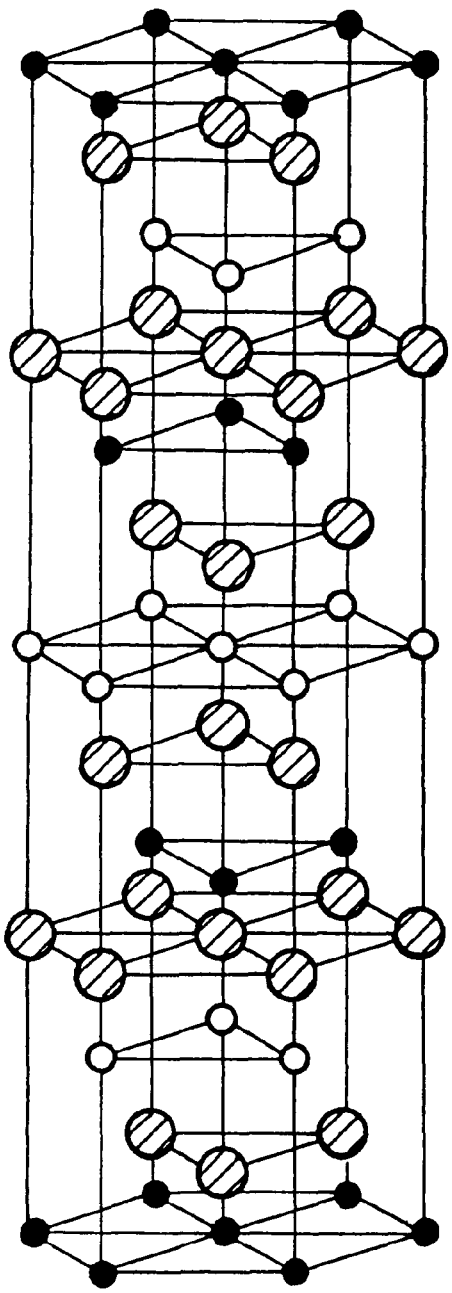
FIG. 1 is a schematic illustration of unit crystal lattice of the layered structure lithium manganese composite oxide.
Figure 2:
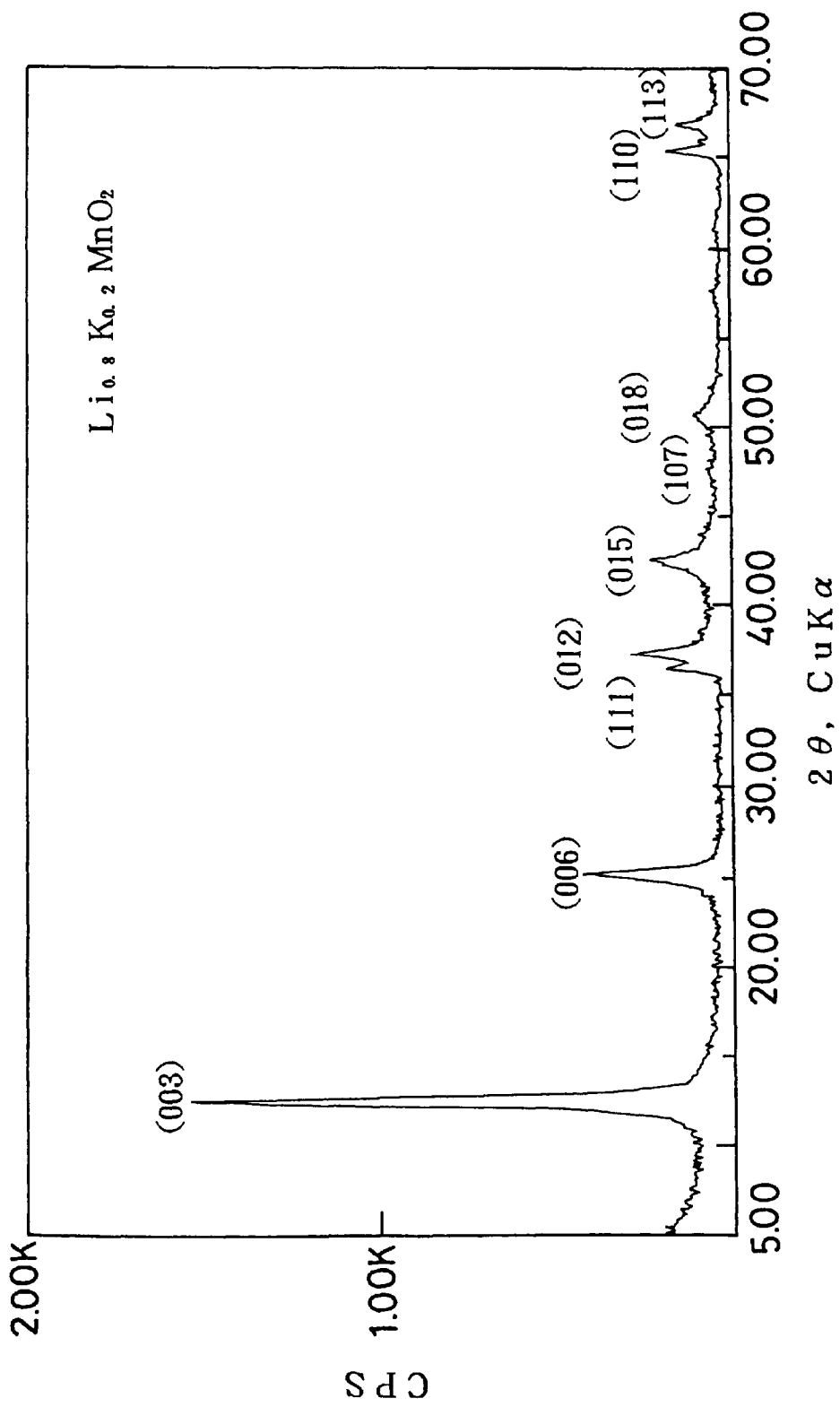
FIG. 2 is the X-ray diffractory pattern of the layered structure lithium manganese composite oxide represented by the composition of formula $Li_{0.8}K_{0.2}MnO_2$.
Figure 3:
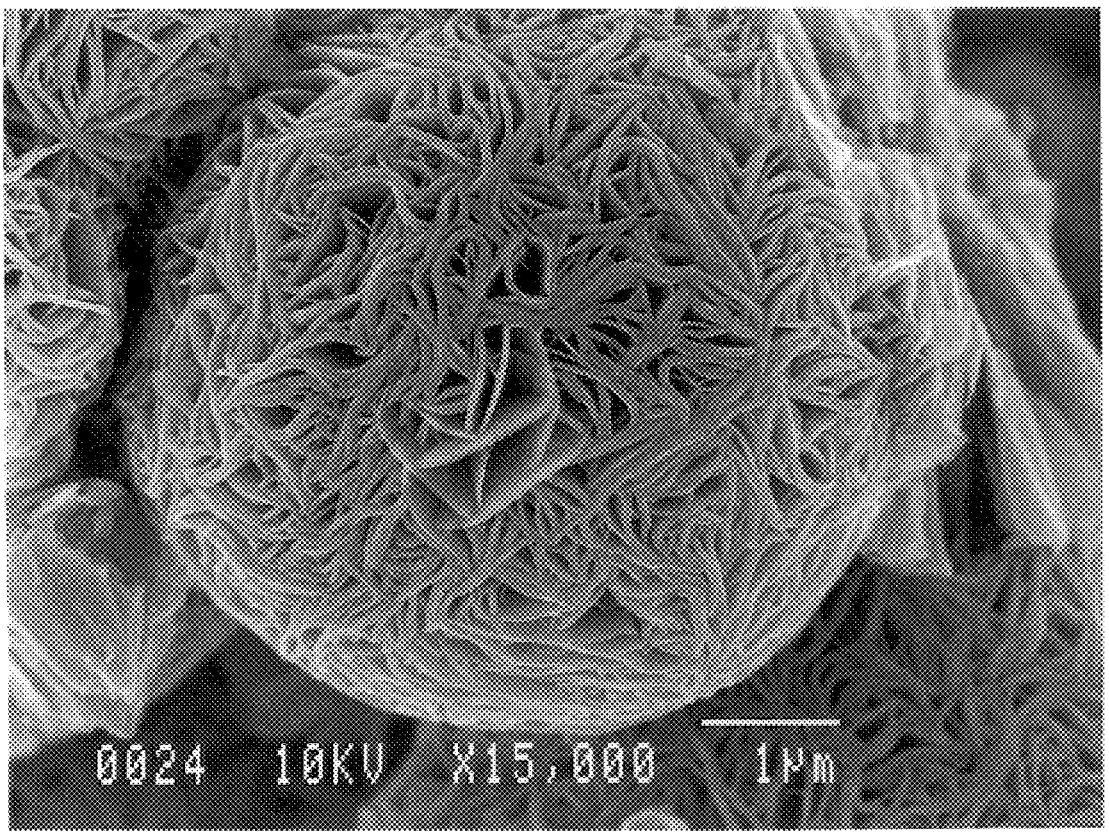
FIG. 3 is the SEM photograph for showing the particle of the layered structure lithium manganese composite oxide represented by the composition formula of $LI_{0.8}K_{0.2}MnO_2$.
Figure 4:
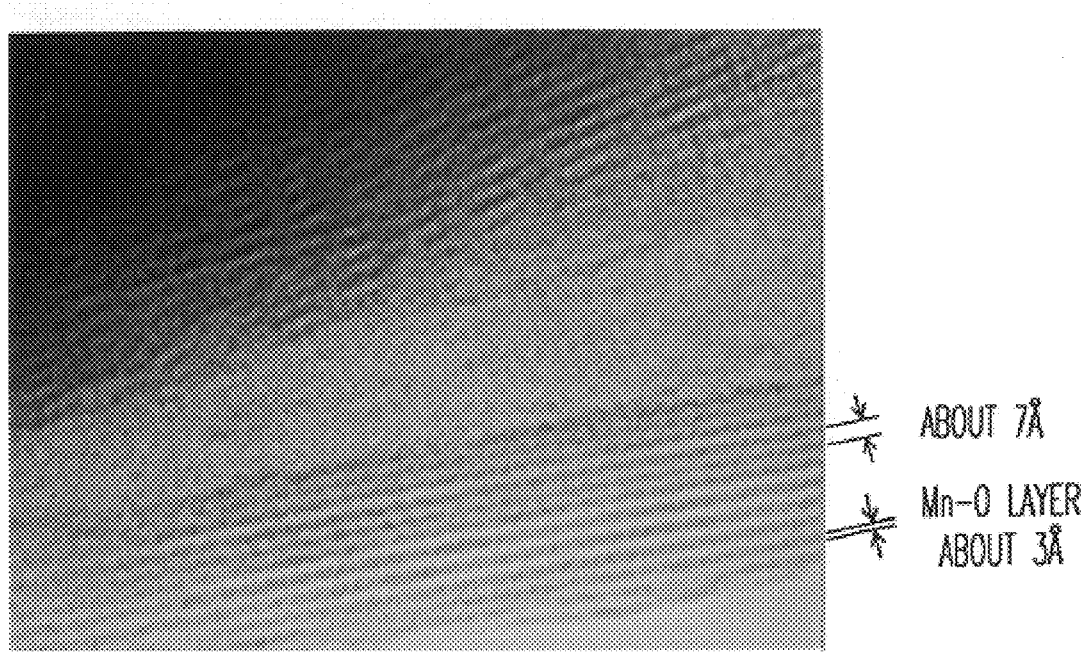
FIG. 4 is the TEM photograph for showing the part of gill of the composite oxide of FIG. 3 in detail.
Figure 5:
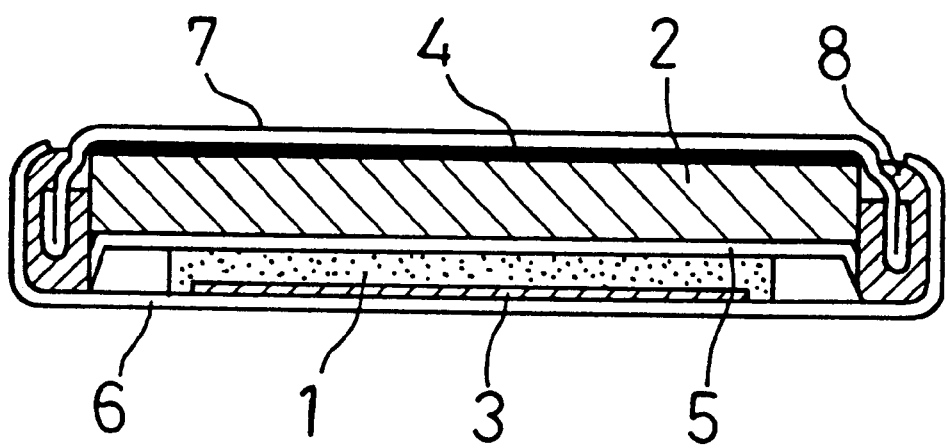
FIG. 5 is the cross section of the coin-type lithium secondary battery produced by the first embodiment.

The coin-type secondary battery is constituted by using the powdery layered lithium manganese oxide as the cathode active material, as shown in FIG. 5. The positive electrode 1 is produced by forming the cathode material in which the powdery cathode active material of 70 weight part, the carbon black of 25 weight part as the conducting material and the Teflon F104 (manufactured by Daikin Kogyo K.K.) of 5 weight part as the binder are mixed, producing the pellet of 13 mm in diameter by pressurizing the cathode material, and then attaching it to the positive current collector 3 of stainless mesh. On the other hand, the negative electrode 2 is produced by blanking the rolled plate of the metallic lithium into a coin-shape piece of 15 mm in the diameter, and then attaching it to the negative current collector 4. The porous film made of the polypropylens is used as the separator 5, and the solution which is prepared by dissolving $LiPF_6$ in the solvent in which the ethylene carbonate and the diethyl carbonate are mixed in the volume ratio 1:1 to have the concentration of 1M is used as the nonaqueous electrolytic solution to be impregnated into the separator 5.

After the negative electrode 2 is disposed under pressure on the negative electrode container 7 made of the stainless which commonly operates as the negative terminal, they are inserted into the recess of insulative gasket 8 made of polypropylene, and the separator 5 and the positive electrode 1 are disposed thereon in this order. Then, the nonaqueous electrolytic solution is poured to be impregnated into the separator 5, and the positive electrode container 6 made of the stainless which commonly operates as the positive terminal is capped and caulked, whereby the battery is completed.

In the explanation of the following embodiments, the battery which uses the layered lithium manganese oxide represented by the composition formula of $Li_{0.8}K_{0.2}MnO_2$ as the cathode active material is represented by [1-1], one which uses $Li_{0.5}K_{0.5}MnO_2$ or $Li_{0.2}K_{0.8}MnO_2$ is represented by [1-2] or [1-3], respectively.

Embodiment 2

In this embodiment 2 of the secondary battery, the layered lithium manganese oxide represented by the composition formula of $Li_{1-x}Na_xMnO_2$ and synthesized by the above mentioned manufacturing method is used as the cathode active material. In the first, the $NaMnO_4$ aqueous solution of 0.3875 M and the LiCl aqueous solution of 0.3M are mixed in the atomic ratio of Li/Na=4/1, 1/1 and 1/4, and then this mixed solution is reacted in the autoclave lined by the Teflon under the hydrothermal condition at temperature of 200° C. for three days, and then a precipitation in the container is filtered and washed with water. Next, this precipitation is thermally dehydrated at the temperature of 200° C. for 4 hours to remove the water of hydration from it. The composition of the powdery layered lithium manganese oxide obtained is respectively $Li_{0.8}Na_{0.2}MnO_2$, $Li_{0.5}Na_{0.5}MnO_2$ and $Li_{0.2}Na_{0.8}MnO_2$.

The coin-type battery same as that in the above Embodiment 1 is produced by using these layered lithium manganese oxides as the cathode active material. Here, the battery which uses $Li_{0.8}Na_{0.2}MnO_2$ as the cathode active material is represented by [3-1], one which uses $Li_{0.5}Na_{0.5}MnO_2$ or $Li_{0.2}Na_{0.8}MnO_2$ as the cathode active material is represented by [2-2] or [2-3], respectively.

Embodiment 3

In this embodiment 3 of the secondary battery, the layered lithium manganese oxide represented by the composition formula of $Li_{1-x}Rb_xMnO_2$ and synthesized by the above mentioned manufacturing method is used as the cathode active material. In the first, the $RbMnO_4$ aqueous solution of 0.3M and the LiCl aqueous solution of 0.3M are mixed in the atomic ratio of Li/Rb=4/1, 1/1 and 1/4, and then this mixed solution is reacted in the autoclave lined by the Teflon under the hydrothermal condition at temperature of 200° C. for three days, and then a precipitation in the container is filtered and washed with water. Next, this precipitation is thermally dehydrated at the temperature of 200° C. for 4 hours to remove the water of hydration from it. The composition of the powdery layered lithium manganese oxide obtained is respectively $Li_{0.8}Rb_{0.2}MnO_2$, $Li_{0.5}Rb_{0.5}MnO_2$ and $Li_{0.2}Rb_{0.8}MnO_2$.

The coin-type battery same as that in the above Embodiment 1 is produced by using these layered lithium manganese oxides as the cathode active material. Here, the battery which uses $Li_{0.8}Rb_{0.2}MnO_2$ as the cathode active material is represented by [3-1], one which uses $Li_{0.5}Rb_{0.5}MnO_2$ or $Li_{0.2}Rb_{0.8}MnO_2$ as the cathode active material is represented by [3-2 ] or [3-3 ], respectively.

Embodiment 4

In this embodiment 4 of the secondary battery, the layered lithium manganese oxide represented by the composition formula of $Li_{1-x}Cs_xMnO_2$ and synthesized by the above mentioned manufacturing method is used as the cathode active material. In the first, the $CsMnO_4$ aqueous solution of 0.3M and the LiCl aqueous solution of 0.3M are mixed in the atomic ratio of Li/Cs=4/1, 1/1 and 1/4, and then this mixed solution is reacted in the autoclave lined by the Teflon under the hydrothermal condition at temperature of 200° C. for three days, and then a precipitation in the container is filtered and washed with water. Next, this precipitation is thermally dehydrated at the temperature of 200° C. for 4 hours to remove the water of hydration from it. The composition of the powdery layered lithium manganese oxide obtained is respectively $Li_{0.8}Cs_{0.2}MnO_2$, $Li_{0.5}Cs_{0.5}MnO_2$ and $Li_{0.2}Cs_{0.8}MnO_2$.

The coin-type battery same as that in the above Embodiment 1 is produced by using these layered lithium manganese oxides as the cathode active material. Here, the battery which uses $Li_{0.8}Cs_{0.2}MnO_2$ as the cathode active material is represented by [4-1], one which uses $Li_{0.5}Cs_{0.5}MnO_2$ or $Li_{0.2}Cs_{0.8}MnO_2$ as the cathode active material is represented by [4-2 ] or [4-3 ], respectively.

Comparative Example 1

The battery of this Comparative example 1 is the lithium secondary battery which uses the layered lithium manganese oxide in which a part of lithium atoms is replaced by hydrogen atoms instead of above alkali metal atoms (both of them are monovalent) and represented by the composition formula of $Li_{1-x}H_xMnO_2$. This layered lithium manganese oxide is produced by the following process. In first the $KMnO_4$ aqueous solution of 0.3M is ion-changed to a $HMnO_4$ aqueous solution by a $H^+$ (proton) changed cationic ion exchanger, and then the solution and the LiCl aqueous solution of 0.3M are mixed in the atomic ratio Li/H=4/1, 1/1 and 1/4. Next, the mixed solution is reacted in the autoclave lined by the Teflon under the hydrothermal condition at temperature of 200° C. for three days, and then a precipitation in the container is filtered and washed with water. And next, this precipitation is thermally dehydrated at the temperature of 200° C. for 4 hours to remove the water of hydration. The obtained layered lithium manganese oxides have respectively a composition formula of $Li_{0.8}H_{0.2}MnO_2$, $Li_{0.5}H_{0.5}MnO_2$ and $Li_{0.2}H_{0.8}MnO_2$.

The coin-type battery same as the Embodiment 1 is produced by using these layered lithium manganese oxide as the cathode active material, among which the battery using $Li_{0.8}H_{0.2}MnO2$ as the cathode active material is represented by [5-1], and those using $Li_{0.5}H_{0.5}MnO_2$ or $Li_{0.2}H_{0.8}MnO_2$ is respectively represented by [5-2] or [5-3].

Comparative Example 2

The battery of this Comparative example 2 is the lithium secondary battery which uses the layered lithium manganese oxide in which no atoms of other elements is replaced at the lithium site and is represented by the composition formula of $LiMnO_2$ as the cathode active material, which has been studied in the prior art. The layered $LiMnO_2$ as the cathode active material is produced by the following process. In first the $KMnO_4$ aqueous solution of 0.3M is ion-changed to $HMnO_4$ aqueous solution by a $H^+$ (proton) changed cationic ion exchanger and a $LiMnO_4$ is prepared by dropping LiOH aqueous solution in the $HMnO_4$ aqueous solution until pH reaches up to 9, and further the solution is adjusted to pH 5.2 with $HNO_3$. Then, the solution is reacted hydrothermally in the autoclave lined by the Teflon under the saturated vapor pressure, at the temperature of 160° C., for three days and half, and then a precipitation in the container is filtered and washed. The coin-type battery same as that in the Example 1 is manufactured by using it as the cathode active material, and is represented by [6].

Change-discharge Cycle Test

For the above various lithium secondary batteries, the charge-discharge test is carried out. In this test, the battery is charged under the constant current density of 0.5 $mA/cm^2$ up to the voltage of 4.2V, is discharged under the constant current density of 0.5 $mA/cm^2$ down to the voltage of 2.5V after leaving it for 10 minutes and is re-charged, to complete one cycle. Under the temperature of 20° C.,the charge and discharge are repeated in 50 cycles to measure the discharging capacity for each cycle.

Relation Between Composition of Layered Lithium Manganese Oxide as the Cathode Active Material, and Initial Discharge Capacity of Battery The data of initial discharge capacity of the batteries [1-1], [2-1] and [3-1] which use $Li_{1-x}K_xMnO_2$, the batteries [2-1 ], [2-2] and [2-3] which use $Li_{1-x}Na_xMnO_2$, and the batteries [5-1 ], [5-2] and [5-3] which use $Li_{1-x}H_xMnO_2$, respectively as the cathode active material, are used to examine the relation between composition of layered lithium manganese oxide to be used as cathode active material, and initial discharge capacity of battery. The result of this test is shown in FIG. 6, in which the ordinate shows the initial discharge capacity of the cathode active material per unit weight, while the abscissa shows the composition of layered lithium manganese oxide that is the replaced rate for the lithium site.

Figure 6:
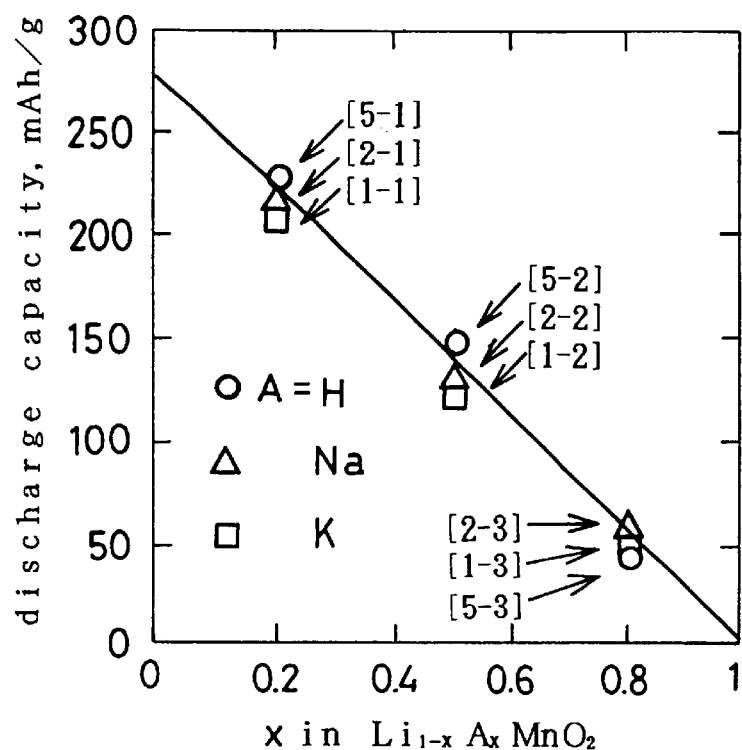
FIG. 6 is the explanatory view for showing the relation between the composition of the layered lithium manganese composite oxide and the initial discharge capacity of the battery using it as the cathode active material, in the lithium secondary battery of the first embodiment.

Apparent from FIG. 6, the initial discharge capacities are not largely differed irrespective of the kind of element to be replaced, and whenever the lithium site is replaced by any kind of the elements, the initial discharge capacities are located on the linear line extending from the point corresponding to the theoreticalcapacity 286 mAh/g of the layered $LiMnO_2$. Thus, the fact that the initial capacity of the secondary battery of the present invention is determined by the amount of lithium atoms not having been replaced and still existing is confirmed.

Relation Between Kind of Element to be Replaced and Capacity Maintained Rate

Next, the relation between kind of the element to be replaced and the capacity maintaining rate (the discharge capacity after 50 cycles/the initial discharge capacity) is examined, based on the initial discharge capacity and the discharge capacity after 50 cycles of the secondary batteries [1-1], [2-1], [3-1], [4-1] and [5-1] which use the layered lithium manganese oxide represented by the composition formula of $Li_{0.8}A_{0.2}MnO_2$ as the cathode active material. The result of test is shown in FIG. 7 in which the ordinate shows the capacity maintained rate, while the abscissa shows the kind of element to be replaced.

Figure 7:
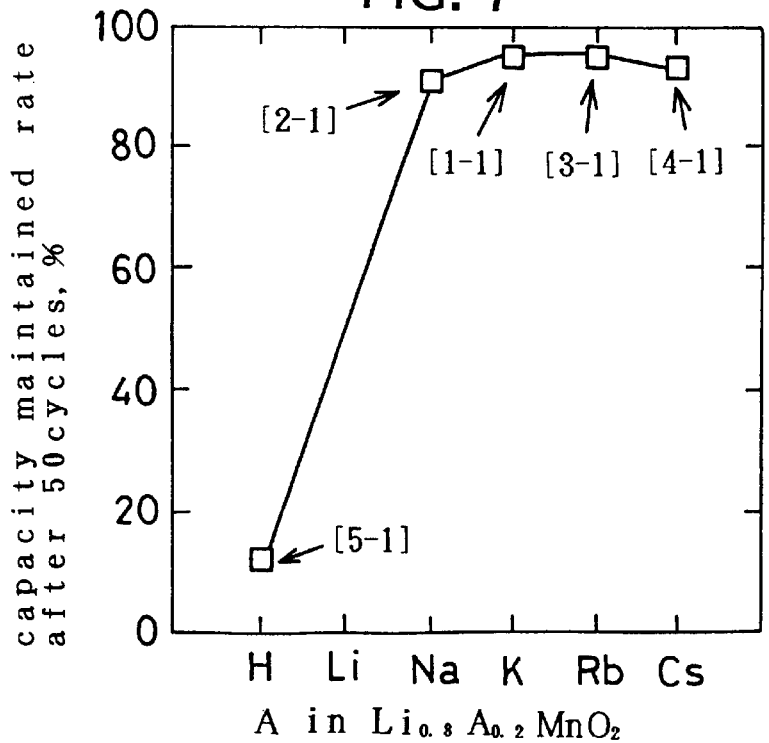
FIG. 7 is the explanatory view showing the relation between the kind of element to be replaced and the capacity maintained rate in the lithium secondary battery of the first embodiment.

Apparent from FIG. 7, it is confirmed that in case when the element A is Na, K, Rb or Cs, the deterioration of discharge capacity is extremely small, compared with the case when the element A is H. This means, the atom diameter of hydrogen atom is smaller than that of the lithium atom, so repeating by the hydrogen atom has not contributed to the stabilization of the crystal structure. To the contrary, since the atom diameter of the alkali metal such as the cesium, rubidium, potassium and sodium is larger than that of the lithium atom, in the layered lithium manganese oxides in which the atoms of such alkali metal elements replace for a part of lithium atoms, the crystal structure has not been changed even after the charge-discharge cycle test. It is assumed in these oxides the transformation from the layered structure to the spinel structure is restricted.

Relation Between Replaced Rate of Alkali Metal Element and Cycle Characteristic

The relation between the replaced rate of the alkali metal element and the cycle characteristic is examined by comparing the cycle characteristic of the batteries [1-1], [1-2] and [1-3] which use the layered lithium manganese oxide represented by the composition formula of $Li_{1-x}K_xMnO_2$, and the battery [6] which uses the layered lithium manganese oxide in which the lithium site is not replaced and is represented by the composition formula of $LiMnO_2$, the result of which is shown in FIG. 8.

Apparent from FIG. 8, in the battery [6] using the layered $LiMnO_2$ the lithium site of which is not replaced as the cathode active material, the discharge capacity is extremely decreased as the cycle advances although the initial discharge capacity is large. On the other hand, all of the batteries [1-1], [1-2] and [1-3] in which a part of the lithium atoms is replaced by the potassium atoms have excellent cycle characteristic is confirmed. Also, confirmed is that the cycle characteristic increases as the replaced rate is selected larger, but increasing rate is not so large.

Judging from the above results, any of the batteries of these embodiments 1 to 4 can stably repeat the charge-discharge in the range of 4.2 to 2.5V, but the replaced rate by the alkali metal element should be determined by taking both of the discharge capacity and the deterioration of cycle characteristic into consideration. For constituting the practical battery, the layered lithium manganese oxide represented by the composition formula of $Li_{1-x}A_xMnO_2$ (A is the alkali metal except for Li) in which x is larger than 0.1 and smaller than 0.5 (0.1<x<0.5) is used as the cathode active material is preferable.

Second Embodiment

Based on the above embodying form, various layered lithium manganese oxide of the present invention different from the above first embodiment are manufactured to constitute the coin-typelithium secondary battery, which are listed as the embodiments. Also, for comparison with the secondary battery of these embodiments, the secondary battery which adopts the lithium manganese oxide with the zigzag layered structure represented by the composition formula of $LiMnO_2$ as the cathode active material, and the battery which adopts the layered lithium manganese oxide produced by the conventional method and is represented by the composition formula of $LiMnO_2$ as the cathode active material are manufactured. The charge-discharge test are carried out for these secondary batteries to evaluate the cycle characteristic thereof, whereby excellency of the layered lithium manganese oxide and the manufacturing method of the present invention are confirmed.

Embodiment I

The mixed aqueous solution in which the KMnO4 aqueous solution of 0.3M and the LiOH aqueous solution of 0.3M are mixed in the atomic ratio of Li/Mn=2/1, is put into the autoclave lined by the fluoride resin, to hydrothermally treat it under the saturate vapor pressure, at the temperature of 200° C., for 20 hours. Then, the reacted solution is filtered, and the filtered crystal is washed and dried in the air at 50° C., to obtain the crystal powder of the layered $K_{0.3}Li_{0.7}Mn_2O.6H_2O$. This crystal powder can be, by the XRD measurement (X-ray diffraction analysis), indexed as the hexagonal of a=2.86 Å, c=7.01 Å, so that it has the sandwich-construction in which the $MnO_2$ complex layer (one comprised of the manganese atom layer and two oxygen atom layers sandwiching it) is sandwiched by Li and $H_2O$. This crystal powder is heated in air at 150° C. for 5 hours to dehydrate the water existed between the layers (the water of hydration). In the dehydrated crystal powder, from the fact that the weight is decreased by 13% and only the value of c is decreased down to 4.86 Å in the XRD measurement value, it is confirmed that the dehydrated crystalpowder is the layered lithium manganese oxide which is represented by the composition formula of $K_{0.3}Li_{0.7}MnO_2$ in which the water of hydration is removed and the complex layer thereof is maintained.

Embodiment II

The layered lithium manganese oxide represented by the composition formula of $K_{0.6}Li_{0.4}MnO_2$ is produced by the similar manner same as above embodiment, other than the $KMnO_4$ aqueous solution of 0.3M and the LiOH aqueous solution of 0.3M are mixed in the atomic ratio Li/Mn=3/2.

Embodiment III

The layered lithium manganese oxide represented by the composition formula of $K_{0.8}Li_{0.2}MnO_2$ is produced by the similar manner same as above embodiment, other than the $KMnO_4$ aqueous solution of 0.3M and the LiOH aqueous solution of 0.3M are mixed in the atomic ratio Li/Mn=1/4.

Comparative example I

This is the lithium manganese oxide with the zigzag layered structure represented by the composition formula $LiMnO_2$ is prepared by firing the mixture of LiOH and $Mn_2O_3$ in the atomic ratio of Li/Mn=1/1.05 in air at the temperature of 700° C. for 6 hours.

Comparative Example II

This is the layered lithium manganese oxide prepared by the conventional manufacturing method. That is, the $KMnO_4$ aqueous solution of 0.3M is ion-changed by the $H^+$ (proton) changed cationic ion exchanger to the $HMnO_4$ (proton type) aqueous solution, then the LiOH aqueous solution is dropped into it until the pH reaches to 9, to thereby prepare $LiMnO_4$. This solution is adjusted to pH 5.2 with $HNO_3$, and then is put into the autoclave lined by the fluoride resin, to hydrothermally treat under the saturated vapor pressure, at the temperature of 160° C., for three days and half. Thereafter, the reacted solution is filtered, and the filtered crystal is washed and dried, and then it is dehydrated, whereby the layered lithium manganese oxide represented by the composition formula of $LiMnO_2$ is manufactured.

Production of Coin-type Secondary Battery with Nonaqueous Electrolytic Solution The coin-type lithium secondary batteries which use the lithium manganese oxides of the above embodiments and comparative examples as the cathode active material are produced. The coin-type lithium battery is, similar to that of the first embodiment, comprised of a positive electrode, a negative electrode, a separator for separating these electrodes from each other, a positive electrode can, a negative electrode can, a positive current collector, a negative current collector and a insulating packing made of polypropylene.

The positive electrodes and the negative electrodes are opposed to each other via the separates into which the nonaqueous electrolytic solution is impregnated to be contained in the battery case comprised of the positive electrode can and the negative electrode can. The positive electrodes are connected to the positive electrode can via the positive current collectors, while the negative electrodes are connected to the negative electrode can via the negative current collectors, so that the chemical energy generated in the battery is derived through the terminals of the positive electrode can and the negative electrode can as the electrical energy.

The positive electrode is manufactured by mixing the lithium manganese oxide in the above embodiments and the comparative examples as the cathode active material, the acetylene black as the conducting material and the fluororesin (PTEF) powder as the binder in the weight ratio of 70:25:5, forming the mixture into the circur-shape under the forming pressure of $2t/cm^2$, and then subjecting it to the heat treatment in the vacuum at temperature of 200° C. The negative electrode is produced by using the lithium plate blanked from the rolled lithium plate of predetermined thickness into the circular shape. The nonaqueous electrolytic solution is prepared by dissolving $LiPF6$ into the mixed solvent in which the ethylene carbonate and the diethylene carbonate are mixed in the same volume to have 1M.

Here, the secondary battery produced by using the lithium manganese oxide of the embodiment I as the cathode active material is named as the embodiment battery I, and the secondary battery produced by using the lithium manganese oxide of the embodiment II as the cathode active material is named as the embodiment battery II. Likewisely, the secondary batteries corresponding to the embodiment III, comparative example I and comparative example II are respectively named as the embodiment battery III, comparative battery I or comparative battery II.

Charge-discharge Cycle Test

The produced secondary battery is subjected to the charge up to 4.2V at $0.5 \text{ mA/cm}^2$ and then to the discharge down to 2.5V at $0.5 \text{ mA/cm}_2$, at the room temperature, to form one cycle, and the charge-discharge cycle test in which the charge and discharge are repeated to measure the discharge capacity (mAh) for each cycle is carried out. The result of this charge-discharge cycle test is shown in FIG. 9.

According to FIG. 9, in the embodiment battery I, the number of cycles where the decrease of discharge capacity occurs is greatly increased, compared with the comparative example batteries I and II, which is resulted from the lithium manganese oxide used in the embodiment battery I as the cathode active material has changed to the stable layered structure. No decrease of discharge amount is found in the embodiment batteries II and II, which is resulted from that the crystal structure of lithium manganese oxide used in the batteries as the cathode active material has the same layered structure as that of $LiNiO_2$ or $LiCoO_2$, and that the $K^+$ is held between the complex layers. That is, in the crystal in which $K^+$ is held between the complex layers, the transformation of crystal structure from the layered structure to the spinel structure is restricted, so that the decrease of discharge capacity due to transformation of the crystal structure is restricted.

Third Embodiment

This third embodiment intends to confirm the effect when the lithium manganese oxide obtained by mixing two kinds of crystal structure (layered structure and spinel structure) is used as the cathode active material. The layered $Li_{1-x}A_xMnO_2$ is actually synthesized and mixed with the available spinel $LiMnO_4$ to constitute the lithium manganese oxide to be used as the cathode active material of the lithium secondary battery. This lithium secondary battery is subjected to the charge-discharge test to confirm the quality thereof. In the following, various embodiments will be explained. Here, the lithium secondary batteries to be manufactured (so-called "the lithium ion secondary battery") use the carbon material as the anode active material and have the cylindrical shape in which the sheet-like electrode is rolled.

Embodiment A

In the mixture of the spinel lithium manganese oxide represented by the composition formula of $LiMn_2O_4$ and the layered lithium manganese oxide represented by the composition formula of $Li_{0.9}K_{0.1}MnO_2$, the influence of mixed rate to the battery quality is examined. Also, the lithium secondary battery is produced by using the mixture in which the lithium manganese oxide with the zigzag layered structure represented by the composition formula of $LiMnO_2$, which is different from the layered structure is mixed, to compare with the lithium secondary battery of the present invention.

The layered $Li_{0.9}K_{0.1}MnO_2$ is produced by preparing the aqueous solution in which the $LiNO_3$ aqueous solution of 0.3M and the $KMnO_4$ aqueous solution of 0.3M are mixed into the atomic ratio Li:K=9:1, then putting the mixed solution into the autoclave lined by the Teflon, and hydrothermally treating it under the saturate vapor pressure at the temperature of 200° C. for three days, and then thermally dehydrating at 200° C. for 4 hours to remove the water of hydration. As result of the powder X-ray diffraction, synthesized $Li_{0.9}K_{0.1}MnO_2$ is confirmed to have the layered structure.

Next, three kinds of the mixtures of lithium manganese complex oxides are prepared by mixing the available spinel $LiMn_2O_4$ (manufactured by Honjo Chemical K.K.) synthesized by the solid state reaction method and the above layered $Li_{0.9}K_{0.1}MnO_2$ in the mol ratio of 2:1, 1:1 and 1:2 respectively. In addition to them, the oxide composed only by the spinel $LiMnO_2$ and the oxide composed only by the layered $Li_{0.9}K_{0.1}Mn_2O_2$ are prepared.

With each of lithium manganese oxides of 90 weight part as the cathode active material, the carbon micro beads (TB5500:manufactured by Tokai Carbon K.K.) of 7 weight part as the conducting material and the polyvinylidene fluoride of 3 weight part as the binder are mixed, then N-methylpyrolidone of suitable amount is added to form the cathode material paste. The obtained cathode material paste is coated on the both surfaces of the positive current collector made of aluminum foil having thickness of 20 μm, width of 54 mm and length of a500 mm, and is subjected to the pressure forming after drying. Thus, the positive electrode is obtained.

The graphitalized meso carbon micro beads (MCMB25-28:manufactured by Ooska Gas Chemical K.K. ) is used as the anode active material. With the MCBC of 95 weight part, the polyvinylidene fluoride of 5 weight part as the binder is mixed, and the N-methylpyrrolidene of suitable amount is added to form the anode material paste. The obtained anode material paste is coated on the both surface of the negative current collector made of copper foil having thickness of 10 μm, width of 56 mm and length of 520 mm, and is subjected to the pressure forming after drying, whereby the negative electrode is obtained.

The above positive electrode and the negative electrode are rolled with sandwiching the porous polypropylene film of 20 μm thickness as the separator to form the roll-shaped the electrode unit. This electrode unit is inserted into the cylindrical cell of 18650 type (diameter:18 mm, length:65 mm), the nonaqueous electrolytic solution is poured into the cell and impregnated into the electrode unit, and the cell is sealed to constitute the lithium secondary battery. The nonaqueous electrolytic solution is produced by dissolving $LiPF_6$ of the concentration of 1M into the mixed solvent in which the ethylene carbonate and the diethylene carbonate are mixed by the volume ratio of 1:1.

The lithium secondary battery which uses the lithium manganese complex in which the spinel $LiMn_2O_4$ and the layered $Li_{0.9}K_{0.1}MnO_2$ are mixed by the mixed rate of 2:1 as the cathode active material is named as the embodiment A-1 secondary battery. Likewisely, the lithium secondary batteries having the above rate of 1 1 and 1:2 are named as the embodiment A-2 secondary battery, and the embodiment A-3 secondary battery, respectively. Further, the secondary battery which uses only the spinel $LiMn_2O_4$ as the cathode active material is named as the comparative example A-1 secondary battery, and the secondary battery which uses only the layered $Li_{0.9}K_{0.1}MnO_2$ as the cathode active material is named as the comparative example A-2 secondary battery.

Next, the secondary battery which uses the lithium manganese oxide in which the spinel $LiMn_2O_4$ and the $LiMnO_2$ with the zigzag layered structure are mixed as the cathode active material. The $LiMnO_2$ with zigzag layered structure is prepared by mixing $MnO_2$ and $Li_2CO_3$ by mol ratio of 1:0.5, and firing this mixture in the air under the temperature of 800° C., for 8 hours. The lithium secondary battery which uses the mixture of the spinel $LiMn_2O_4$ and the $LiMnO_2$ with the zigzag layered structure by the mol rate of 2:1 is named as the comparative example B-1 secondary battery, and the lithium secondary battery having the above mol rate of 1:2 is named as the comparative example B-2 secondary battery. In these secondary batteries, the components other than the cathode active material are same that of the above embodiment.

The charge-discharge test are carried out for the lithium secondary batteries of the above embodiments and the comparative examples. In the first, at the temperature of 20° C., the conditioning is carried out to charge in the constant current of current density at 0.25 mA/cm² up to the charge finishing voltage of 4.2V, then to discharge in the constant current of current density at 0.25 mA/cm² down to the discharge finishing voltage 3.0V. The charged capacity and the discharge capacity in this conditioning are measured to calculate the retention rate by the following formula.

retention rate(%)=charged capacity-discharge capacity)/discharge capacity×100

The charge-discharge cycle test is carried out for the secondary battery having been finished the conditioning. In the charge-discharge test, at the environmental temperature of 20° C., the charge is carried out in the constant current of current density at 1 mA/cm² Up to the charge finishing voltage of 4.2V, and then the discharge is carried out in the constant current of current density at 1 mA/cm² down to the discharge finishing voltage of 3.0V. The above charge and discharge forms one cycle, and the test is carried out by 100 cycles. The discharge capacity in the first cycle is measured to be set as the initial discharge capacity, and the discharge capacity in the 100-th cycle is measured, to calculate the capacity maintained rate by the following formula.

capacity maintained rate(%)=discharge capacity in the 100-th cycle/initial discharge capacity×100

In the following Table 1, the atomic ratio of Li to Mn (Li/Mn) in the lithium manganese oxide, the retention rate, the initial discharged capacity and the capacity maintained rate of the lithium secondary batteries of the embodiments and the comparative examples are shown.

TABLE 1

| | Mixed rate (mol ratio) | Atomic ratio (Li/Mn) | Retention rate (%) | Initial discharge capacity (mAh) | Capacity maintained rate (%) |
|---|---|---|---|---|---|
| Spinal $LiMn_2O_4$:Layered $Li_{0.9}K_{0.1}MnO_2$ | | | | | |
| Comparative example A-1 | 1:0 | 0.50 | 15 | 425 | 96 |
| Embodiment A-1 | 2:1 | 0.58 | 10 | 540 | 94 |
| Embodiment A-2 | 1:1 | 0.63 | 8 | 644 | 93 |
| Embodiment A-3 | 1:2 | 0.78 | 6 | 752 | 90 |
| Comparative example A-2 | 0:1 | 0.90 | 3 | 873 | 87 |
| Spinel $LiMn_2O_4$:$LiMnO_2$ with zigzag layered structure | | | | | |
| Comparative example B-1 | 2:1 | 0.58 | 8 | 554 | 89 |
| Comparative example B-2 | 1:2 | 0.78 | 4 | 776 | 48 |

As apparent from the Table 1, it is confirmed that in the lithium secondary battery which uses the mixture of the spinel $LiMnO_2$ and the layered $Li_{0.9}K_{0.1}MnO_2$ as the cathode active material, as the mixed rate of the layered $Li_{0.9}K_{0.1}MnO_2$ that is the atomic ratio (Li/Mn) increases, the retention rate decreases and the initial discharge capacity increases, and the capacity maintained rate decreases. It is also confirmed that in the embodiment A-1,A-2 and A-3 batteries in which the spinel $LiMn_2O_4$ and the layered $Li_{0.9}K_{0.1}MnO_2$ are mixed, the initial discharge capacity and the capacity maintained rate are balanced, compared with the comparative example A-1 and A 2 batteries in which only the spinel LiMn$_2$O$_4$ or the layered Li$_{0.9}$K$_{0.1}$MnO$_2$ is used alone. Also, judging from the fact that the capacity maintained rate decreases extremely when Li/Mn≧0.7, the desirable range of the atomic ratio thereof is 0.55<Li/Mn<0.65.

Meanwhile, in the secondary batteries of the comparative example B-1 and B-2 which use the mixture of the spinel LiMn$_2$O$_4$ and the LiMnO$_2$ with the zigzag layered structure as the cathode active material, although the retention rate and the initial discharged amount are excellent compared with the embodiment of the same atomic ratio, the capacity maintained rate decreases extremely. This results from that the zigzag layered structure is unstable. From this point, excellency of the lithium secondary battery of the present invention with which the lithium manganese oxide with the layered structure is mixed is confirmed.

Embodiment B

In this embodiment B, the influence of the composition of the layered Li$_{1-x}$K$_x$MnO$_2$ to be mixed, that is the value of x, to the battery quality is examined. In the first, the LiNO$_3$ aqueous solution of 0.3M and the KMnO$_4$ aqueous solution of 0.3M are mixed so that the atomic ratio between Li and K (Li:K) has respectively 0.95:0.05, 0.9:0.1, 0.8:0.2, 0.6:0.4 and 0.2:0.8. Then this mixed aqueous solution is put into the autoclave lined with the Teflon to be hydrothermally treated at the temperature of 200° C., under the saturate vapor pressure for 3 days, and then is thermally dehydrated at the temperature of 20° C., for 4 hours to remove the water of hydration. As result of the powder X-ray diffraction analysis, each of the synthesized Li$_{1-x}$K$_x$MnO$_2$ has the layered structure similar to the embodiment A. Respective composition of the layered Li$_{1-x}$K$_x$MnO$_2$ corresponding to above atomic ratio is Li$_{0.95}$K$_{0.05}$MnO$_2$, Li$_{0.9}$MnO$_2$, Li$_{0.8}$K$_{0.2}$MnO$_2$, Li$_{0.6}$K$_{0.4}$MnO$_2$ and Li$_{0.2}$K$_{0.8}$MnO$_2$.

The mixture of the layered Li$_{1-x}$K$_x$MnO$_2$ and the spinel LiMn$_2$O$_4$ same as that in the embodiment A by the mol ratio 1:1 is used as the cathode active material to produce the lithium secondary battery. Here, the secondary battery which uses the lithium manganese oxide including the layered Li$_{0.95}$K$_{0.05}$MnO$_2$ as the cathode active material is named as the secondary battery of embodiment B-1. Likewisely, the secondary battery which uses the lithium manganese oxide including the layered Li$_{0.9}$K$_{0.1}$MnO$_2$, Li$_{0.8}$K$_{0.2}$MnO$_2$, Li$_{0.6}$K$_{0.4}$MnO$_2$ or Li$_{0.2}$K$_{0.8}$MnO$_2$ is named as the battery of embodiment B-2, B-3, B-4 or B-5, respectively. In these secondary batteries, all the components other than the cathode active material are same as that of the above embodiment A.

For these secondary batteries, the charge-discharge test is carried out under the condition same as the embodiment A to calculate the retention rate, the initial discharge capacity and capacity maintained rate. In the following Table 2, the atomic ratio of Li to Mn (Li/Mn) in the mixed lithium manganese oxide, the retention rate, the initial discharged capacity and the capacity maintained rate of each lithium secondary battery are shown.

TABLE 2

| | Value of x | Atomic ratio (Li/Mn) | Retention rate (%) | discharge capacity (mAh) | Capacity maintained rate (%) |
|---|---|---|---|---|---|
| Spinal LiMn$_2$O$_4$:Layered Li$_{1-x}$K$_x$MnO$_2$ = 1:1 | | | | | |
| Embodiment B-1 | 0.05 | 0.65 | 6 | 666 | 85 |
| Embodiment B-2 | 0.10 | 0.63 | 8 | 644 | 93 |
| Embodiment B-3 | 0.20 | 0.60 | 9 | 578 | 94 |
| Embodiment B-4 | 0.4o | 0.53 | 11 | 480 | 96 |
| Embodiment B-5 | 0.80 | 0.40 | 14 | 298 | 97 |

As apparent from the Table 2, as the value of x in the layered structure Li$_{1-x}$K$_x$MnO$_2$ to be mixed increases, the atomic ratio of Li to Mn (Li/Mn) in the mixed lithium manganese oxide decreases. Corresponding to it, the retention rate increases, the initial discharge capacity decreases, and the capacity maintained rate increases.

From the above facts, similar to the above embodiment A, it is confirmed that the lithium secondary batteries, which have the excellent characteristic in which the initial discharge capacity and the capacity maintained rate are balanced, are that of the embodiment B-2 and embodiment B-3 which have the atomic ratio (Li/Mn) of 0.55<Li/Mn<0.65.

ADVANTAGE OF PRESENT INVENTION

1) Lithium Manganese Composite Oxide for Lithium Secondary Battery Cathode Active Material It is represented by the composition formula Li$_{1-x}$A$_x$MnO$_2$ (A is alkali metal except for Li:0<x<1) and has the layered structure in which the crystal structure is stabilized by replacing the lithium site of the layered structure LiMnO$_2$ by alkali metal element having larger ionic diameter than the lithium. Accordingly, in the lithium secondary battery which uses this lithium manganese composite oxide as the cathode active material, not only large discharge capacity is maintained but the cycle characteristic is excellent. In addition, the lithium manganese composite oxide does not include the cobalt which has been conventionally used as the cathode active material, but includes the manganese which is rich as the resource and cheap as the main element. Accordingly, the lithium secondary battery can be manufactured in low cost.

2) Manufacturing Method of the Lithium Manganese Composite Oxide

It can manufacture the uniform lithium manganese composite oxide by only mixing the aqueous solution raw material easy to handle, and carrying out the moderate reaction around the temperature of 200° C. once, which is very simple.

3) Lithium Secondary Battery

When it is realized as the lithium ion secondary battery which uses the carbon material as the anode active material, and the cathode active material can be constituted by the mixture of the lithium manganese composite oxide with the spinel structure and that of the present invention. According to the lithium secondary battery of this construction, the problem of retention peculiar to the negative electrode with carbon material can be attenuated safely by the simple manner without using the metal lithium. Thus, the lithium secondary battery which is cheap and excellent in the discharge capacity and the cycle characteristic is realized.

What is claimed is:

1. A lithium manganese composite oxide for a lithium secondary battery cathode active material, comprising a composition of the formula $Li_{1-x}A_xMnO_2$ wherein A is an alkali metal except for Li, $0<x<1$, and the composition has a layered structure with a rock salt type ordered cations of space group $R\bar{3}m$.

2. A lithium manganese composite oxide for a lithium secondary battery cathode active material according to claim 1, wherein said composition has a spherical particle shape.

3. A lithium manganese composite oxide for a lithium secondary battery cathode active material according to claim 2, wherein said spherical particle is a secondary particle comprising intertwined hexagonal plate-shaped primary particles and the spherical particle has gills on a surface thereof.

4. A lithium manganese composite oxide for a lithium secondary battery cathode active material according to claim 3, wherein said hexagonal plate-shaped primary particle has a thickness of 0.05 to 0.5 $\mu$m.

5. A lithium manganese composite oxide for a lithium secondary battery cathode active material according to claim 2, wherein said spherical particle has an average particle diameter of 1 to 50 $\mu$m.

6. A lithium manganese composite oxide for a lithium secondary battery cathode active material according to claim 1, wherein said layered structure with a rock salt type ordered cations has a layer which is composed of manganese atoms and oxygen atoms and which has a thickness of 2.5 to 3Å.

7. A lithium manganese composite oxide for a lithium secondary battery cathode active material according to claim 1, wherein said layered structure with a rock salt type ordered cations has layers each of which comprises manganese atoms and oxygen atoms and said layers are separated by a distance of 6 to 10 Å.

8. The lithium manganese composite oxide of claim 1, wherein A is K.

9. The lithium manganese composite oxide of claim 2, wherein said spherical particle has a diameter of 1–25 $\mu$m.

10. The lithium manganese composite oxide of claim 1, wherein $0<x<0.5$.

* * * * *